US008041807B2

(12) United States Patent
Bao et al.

(10) Patent No.: US 8,041,807 B2
(45) Date of Patent: Oct. 18, 2011

(54) METHOD, SYSTEM AND PROGRAM PRODUCT FOR DETERMINING A NUMBER OF CONCURRENT USERS ACCESSING A SYSTEM

(75) Inventors: Zhendong Bao, Marietta, GA (US); Lisa W. Lewis, Marietta, GA (US); Demethria J. Ramseur, Smyrna, GA (US); Stephen Yu, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 829 days.

(21) Appl. No.: 11/555,855

(22) Filed: Nov. 2, 2006

(65) Prior Publication Data

US 2008/0109547 A1    May 8, 2008

(51) Int. Cl.
*G06F 15/173* (2006.01)
(52) U.S. Cl. .................... 709/224; 455/456.1; 455/456.5
(58) Field of Classification Search .................. 709/201, 709/202.203, 217, 218, 219, 220, 226, 227, 709/228, 242, 203, 223, 231; 707/100, 102; 726/14, 22; 455/423, 456.5, 456.1; 705/35; 714/42
See application file for complete search history.

(56) References Cited

U.S. PATENT DOCUMENTS

| | | | |
|---|---|---|---|
| 5,732,383 A * | 3/1998 | Foladare et al. ........... 455/456.5 |
| 5,812,780 A | 9/1998 | Chen et al. | |
| 5,978,594 A | 11/1999 | Bonnell et al. | |
| 6,013,107 A | 1/2000 | Blackshear et al. | |
| 6,018,619 A | 1/2000 | Allard et al. | |
| 6,148,333 A * | 11/2000 | Guedalia et al. .............. 709/219 |
| 6,182,142 B1 * | 1/2001 | Win et al. ...................... 709/229 |
| 6,362,836 B1 | 3/2002 | Shaw et al. | |
| 6,856,970 B1 * | 2/2005 | Campbell et al. ............... 705/35 |
| 6,907,448 B2 | 6/2005 | Amano et al. | |
| 7,243,145 B1 * | 7/2007 | Poortman ..................... 709/223 |
| 7,373,376 B1 * | 5/2008 | Hamer et al. ................. 709/203 |
| 7,437,446 B2 * | 10/2008 | Bailey et al. .................. 709/223 |
| 7,551,922 B2 * | 6/2009 | Roskowski et al. .......... 455/423 |

(Continued)

FOREIGN PATENT DOCUMENTS

EP    1672871 A2    6/2006

(Continued)

OTHER PUBLICATIONS

PCT International Search Report.

*Primary Examiner* — Dustin Nguyen
(74) *Attorney, Agent, or Firm* — Schmeiser, Olsen & Watts; Anna Linne (57) ABSTRACT

A method, system and program product for determining a number of concurrent users being served by a system at a given point-in-time is provided. The method includes running, at a pre-determined point-in-time, a collection script for collecting user data from one or more target systems, the user data collected including a number of concurrent users logged into each of the target systems at the pre-determined point-in-time. The method further includes generating one or more electronic transmissions for transmitting the user data collected, loading the one or more electronic transmissions generated into a monitoring system, and creating an output file containing the user data. Further, the loading step includes parsing the user data loaded, storing the user data collected and parsed into a database and updating the stored user data. Moreover, the method includes transmitting the output file from the monitoring system to one or more monitoring system clients.

5 Claims, 6 Drawing Sheets

U.S. PATENT DOCUMENTS

| | | |
|---|---|---|
| 2002/0169871 A1 | 11/2002 | Cravo de Almeida et al. |
| 2002/0184263 A1* | 12/2002 | Perinet et al. ................. 707/513 |
| 2003/0023712 A1* | 1/2003 | Zhao et al. .................... 709/223 |
| 2003/0074606 A1* | 4/2003 | Boker ............................. 714/42 |
| 2003/0140131 A1* | 7/2003 | Chandrashekhar et al. .. 709/223 |
| 2003/0187989 A1* | 10/2003 | Petit .............................. 709/227 |
| 2003/0187998 A1 | 10/2003 | Petit |
| 2004/0167912 A1* | 8/2004 | Tsui et al. ..................... 707/100 |
| 2004/0205219 A1* | 10/2004 | Li et al. ......................... 709/231 |
| 2005/0183143 A1* | 8/2005 | Anderholm et al. ............ 726/22 |
| 2006/0168230 A1* | 7/2006 | Caccavale et al. ............ 709/226 |
| 2007/0011300 A1* | 1/2007 | Hollebeek et al. ............ 709/224 |

FOREIGN PATENT DOCUMENTS

| | | |
|---|---|---|
| JP | 2002252723 A | 9/2002 |
| WO | WO 97/43718 A1 | 11/1997 |

* cited by examiner

METHOD, SYSTEM AND PROGRAM PRODUCT FOR DETERMINING A NUMBER OF CONCURRENT USERS ACCESSING A SYSTEM

FIELD OF THE INVENTION

The present invention relates to the field of usage tracking systems and, more particularly, the invention relates to a method, system and computer program product for calculating user statistics for a system, including determining the number of concurrent users that are logged onto the system at any given point in time.

BACKGROUND OF THE INVENTION

In today's business environment, organizations and/or businesses utilize various types of servers for various purposes, such as, electronic mail (e-mail), storage, applications, etc. As demands increase, so does the stress and load placed on the servers that support such organizations and/or businesses. Often, outages are caused by servers that have reached a maximum threshold for stress and load capacity. This leads to downtime that can have a tremendous impact on an organization and/or business. As such, there is a need for an efficient way to manage servers, so that large amounts of stress are not placed on these servers and so that the servers have not reached maximum capacity as far as stress and load.

SUMMARY OF THE INVENTION

In a first aspect of the invention, there is provided a method for determining a number of users being served by a server. The method comprises running, at a pre-determined point-in-time, a collection script for collecting a set of user data from each of a plurality of target systems, the set of user data collected including a number of concurrent users logged into each of the plurality of target systems at the pre-determined point-in-time. In an embodiment, the running step further comprises deploying the collection script on each of the plurality of target systems. The method further comprises generating one or more electronic transmissions for transmitting the set of user data collected from each of the plurality of target systems, loading the one or more electronic transmissions generated into a monitoring system, and creating an output file containing the set of user data. In an embodiment, the loading step further comprises parsing the set of user data loaded from the one or more electronic transmissions, storing the set of user data collected and parsed into a database and updating, at predetermined intervals, the set of user data stored. Moreover, the method further comprises transmitting the output file from the monitoring system to one or more monitoring system clients. In an embodiment, the method further comprises establishing a user identity for each user seeking access to each of the plurality of target systems, the user identity for each user being associated with one or more job roles and being associated with a business group of the one or more business groups, categorizing each user as either an external user or an internal user, and setting up a mail account for each of the plurality of target systems, wherein each of the plurality of target systems are grouped into one or more geographical regions. In an embodiment, the generating step further comprises producing a count of the number of concurrent users for each of the one or more business units, counting separately any user having an unknown job role, and providing a count of any external users. In an embodiment, the set of user data collected for each of the plurality of target systems comprises at least one of: total number of users daily, total number of users hourly, average number of users daily, total number of users in each of the plurality of regions daily, total number of users in each of the plurality of regions hourly, average number of users daily in each of the plurality of regions, time of login by a user, business group to which a user belongs and time of logout by a user. In an embodiment, the one or more electronic transmissions comprise at least one of: e-mails and FTP files and the output file created comprises an XML file that is configured to interface with the one or more monitoring system clients.

In another aspect of the invention, there is provided a system for predicting user load for a server at a pre-determined point-in-time. The system comprises a collection script configured to run, at a pre-determined point-in-time, on each of a plurality of servers, the collection script being configured to gather user statistics, including a number of concurrent users accessing each of the plurality of servers at the pre-determined point-in-time, a mail script configured to generate one or more electronic transmissions containing the user statistics gathered, and a utility script configured to load the one or more electronic transmissions generated into a data collection tool, the data collection tool being configured to create an output file containing the user statistics for predicting the user load for each of the plurality of servers at the pre-determined point-in-time. In an embodiment, the utility script is further configured to parse contents of the one or more electronic transmissions loaded, to store the contents parsed into a database and to update, at predetermined intervals, the user statistics stored. In an embodiment, the data collection tool is further configured to interface with one or more monitoring system clients. In an embodiment, the data collection tool is further configured to establish a user identity for each user for accessing any of the plurality of servers, the user identity being associated with one or more job roles and being associated with a business group of the one or more business groups, whereas the data collection tool is further configured to categorize each user as either an external user or an internal user, and wherein the data collection tool is further configured to set up a mail account for each of the plurality of servers, each of the plurality of servers being grouped into one or more regions. In an embodiment, the one or more electronic transmissions comprise at least one of: e-mails and FTP files and the output file created comprises an XML file that is configured to interface with the one or more monitoring system clients. In an embodiment, the user statistics gathered for each of the plurality of servers comprises at least one of: total number of users daily, total number of users hourly, average number of users daily, total number of users in each of the plurality of regions daily, total number of users in each of the plurality of regions hourly, average number of users daily in each of the plurality of regions, time of login by a user, business group to which a user belongs and time of logout by a user.

In yet another aspect of the invention, there is provided a computer program product for determining a number of concurrent users accessing a target system. The computer program product includes a computer readable medium, first program instructions to collect, at established times, a set of user data from a plurality of target systems, the set of user data including a number of concurrent users accessing each of the plurality of target systems at the established times. The computer program product further includes second program instructions to generate one or more electronic transmissions containing the set of user data collected. The computer program product also includes third program instructions to load the one or more electronic transmissions generated into a data collection tool, the data collection tool being configured to create an output file containing the set of user data for determining the number of concurrent users accessing a target system of the plurality of target systems, and wherein the first, second and third program instructions are stored on the computer readable medium. In an embodiment, the first program instructions include instructions to deploy a collection script for collecting the set of user data on each of the plurality of target systems. Further, in an embodiment, the first program instructions include instructions to establish a user identity for each user seeking access to each of the plurality of target systems, the user identity for each user being associated with one or more job roles and being associated with a business group of the one or more business groups, and instructions to categorize each user as either an external user or an internal user. The first program instructions include instructions to set up a mail account for each of the plurality of target systems, where each of the plurality of target systems is grouped into one or more geographical regions. In an embodiment, the second program instructions include instructions to produce a count of the number of concurrent users for each of the one or more business units, to count separately any user having an unknown job role, and to provide a count of any external users. Further, in an embodiment, the third program instructions include instructions to parse contents of the one or more electronic transmissions loaded, to store the contents parsed into a database and to update, at predetermined intervals, the set of user data stored. In an embodiment, the set of user data collected for each of the plurality of target systems comprises at least one of total number of users daily, total number of users hourly, average number of users daily, total number of users in each of the plurality of regions daily, total number of users in each of the plurality of regions hourly, average number of users daily in each of the plurality of regions, time of login by a user, business group to which a user belongs and time of logout by a user, and wherein the one or more electronic transmissions comprise at least one of: e-mails and FTP files and the output file created comprises an XML file that is configured to interface with the one or more monitoring system clients. Preferably, each of the first, second, third and fourth program instructions are stored on the computer readable medium.

Further, in yet another aspect of the invention, there is provided a process for deploying computing infrastructure that includes integrating computer-readable code into a computing system, wherein the code in combination with the computing system is capable of performing a process for monitoring user load for a target system at a pre-determined point-in-time. The process comprises establishing a user identity for each user seeking access to each of a plurality of target systems, the user identity for each user being associated with one or more job roles and being associated with a business group of the one or more business groups, categorizing each user as either an external user or an internal user, and setting up a mail account for each of the plurality of target systems, wherein each of the plurality of target systems is grouped into one or more geographical regions. The process further comprises running, at a pre-determined point-in-time, a collection script for collecting a set of user data from each of the plurality of target systems for monitoring said user load, the set of user data collected including a number of concurrent users logged into each of the plurality of target systems at the pre-determined point-in-time, generating one or more electronic transmissions for transmitting the set of user data collected from each of the plurality of target systems, and loading the one or more electronic transmissions generated into a monitoring system. In an embodiment, the running step further comprises deploying the collection script on each of the plurality of target systems. In an embodiment, the generating step further comprises producing a count of the number of concurrent users for each of the one or more business units, counting separately any user having an unknown job role, and providing a count of any external users. In an embodiment, the loading step further comprises parsing the set of user data loaded from the one or more electronic transmissions, storing the set of user data collected and parsed into a database, and updating, at predetermined intervals, the set of user data stored. Moreover, the process comprises creating an output file containing the set of user data, and transmitting the output file created from the monitoring system to one or more monitoring system clients. In an embodiment, the one or more electronic transmissions comprise at least one of: e-mails and FTP files and the output file created comprises an XML file that is configured to interface with the one or more monitoring system clients. Further, in an embodiment, the set of user data collected for each of the plurality of target systems comprises at least one of: total number of users daily, total number of users hourly, average number of users daily, total number of users in each of the plurality of regions daily, total number of users in each of the plurality of regions hourly, average number of users daily in each of the plurality of regions, time of login by a user, business group to which a user belongs and time of logout by a user.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the present invention provides a method for determining a number of users being served by a server. The method comprises running, at a pre-determined point-in-time, a collection script for collecting a set of user data from each of a plurality of target systems, the set of user data collected including a number of concurrent users logged into each of the plurality of target systems at the pre-determined point-in-time. In an embodiment, the running step further comprises deploying the collection script on each of the plurality of target systems. The method further comprises generating one or more electronic transmissions for transmitting the set of user data collected from each of the plurality of target systems, loading the one or more electronic transmissions generated into a monitoring system, and creating an output file containing the set of user data. In an embodiment, the loading step further comprises parsing the set of user data loaded from the one or more electronic transmissions, storing the set of user data collected and parsed into a database and updating, at predetermined intervals, the set of user data stored. Moreover, the method further comprises transmitting the output file from the monitoring system to one or more monitoring system clients. In an embodiment, the method further comprises establishing a user identity for each user seeking access to each of the plurality of target systems, the user identity for each user being associated with one or more job roles and being associated with a business group of the one or more business groups, categorizing each user as either an external user or an internal user, and setting up a mail account for each of the plurality of target systems, wherein each of the plurality of target systems are grouped into one or more geographical regions. In an embodiment, the generating step further comprises producing a count of the number of concurrent users for each of the one or more business units, counting separately any user having an unknown job role, and providing a count of any external users. In an embodiment, the set of user data collected for each of the plurality of target systems comprises at least one of: total number of users daily, total number of users hourly, average number of users daily, total number of users in each of the plurality of regions daily, total number of users in each of the plurality of regions hourly, average number of users daily in each of the plurality of regions, time of login by a user, business group to which a user belongs and time of logout by a user. In an embodiment, the one or more electronic transmissions comprise at least one of: e-mails and FTP files and the output file created comprises an XML file that is configured to interface with the one or more monitoring system clients.

As used herein, the term "target system" refers to any system or server that is running a particular target application for which user statistics or data is to be collected. Similarly, "target systems" refer to multiple systems or servers that are running a particular target application for which user statistics or data is to be collected. Moreover, as used herein the term "monitoring system" refers to a system or server that has a monitoring application deployed thereon for remotely monitoring one or more target systems, such as, the CRM Scorecard monitoring application program that is commercially available from International Business Machines (IBM) Corporation. Further, the term "data collection tool" or "data collection component" refers to a component of the monitoring application deployed on the monitoring system that is configured to remotely collect user statistics or data from target systems, including a number of concurrent users accessing a target system. Moreover, the term "data collection script" refers to the script deployed on the target systems, which collects the user statistics or data and sends or communicates the user statistics or data to the data collection tool or component of the monitoring system. Further, the term "monitoring system clients" refers to any application client or any customer or subscriber client of the monitoring system.

Figure 1:
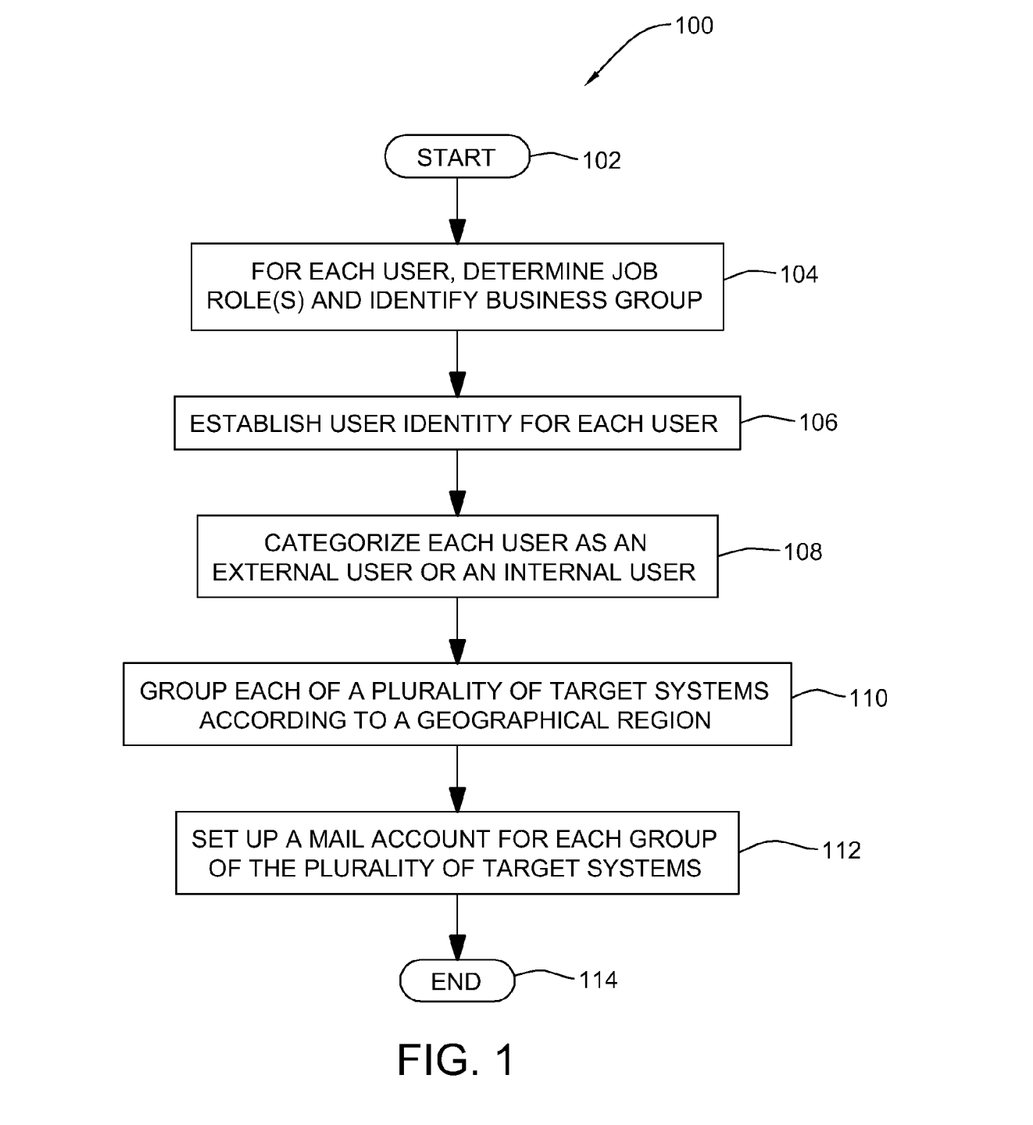
FIG. 1 depicts a flowchart for defining users that access one or more target systems as well as defining the one or more target systems in order to gather user statistics, including determining a number of concurrent users served by one or more target systems, in accordance with an embodiment of the present invention.
Figure 2:
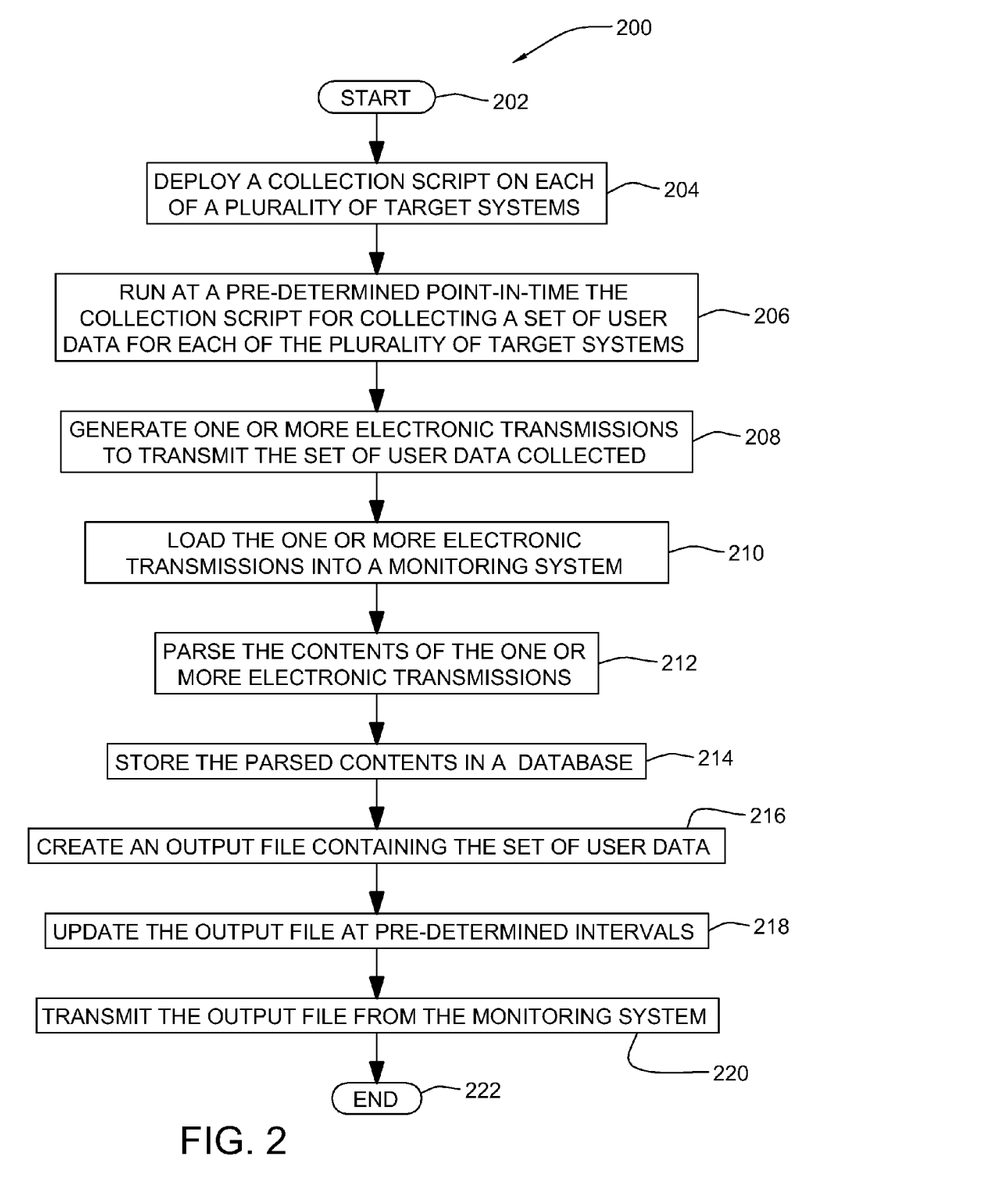
FIG. 2 depicts a flowchart for determining a number of concurrent users served by one or more target systems, in accordance with an embodiment of the present invention.

Reference is now made to FIGS. 1 and 2, which outline the steps involved in different aspects of predicting or determining a number of users being served by a system, such as a server, in accordance with an embodiment of the invention. Turning to FIG. 1, numeral 100 shows a flowchart that outlines the steps for defining or categorizing users that can access one or more target systems as well as defining one or more target systems for which user statistics are to be gathered. The method starts at 102 with determining or defining in step 104 a job role or job roles for each user that will be accessing a target system to be monitored. Further, in step 104, the business group of user is determined. In step 106, a user identity, such as username and password, is established for each of the users. Further, each user is categorized in step 108 as being either an internal user within an organization/business or an external user with respect to an organization/business, so that users can be tracked/counted as desired. Furthermore, in step 110, each target system that is to be monitored is grouped into one or more groups, where each group represents a separate geographical region, such that, user statistics, such as user load can be monitored for a particular geographical region of interest. Moreover, a group of target systems representing a geographical region can comprise one target system, that is, if the geographical region has only one target system. Additionally, in step 112, a mail account is set up for each group of target systems, ending the set up process at step 114. In particular, the mail accounts are set up so that any user statistics gathered for each of the one or more target systems can be grouped according to a group of target systems in a geographical region and can be e-mailed to a data collection tool, as explained herein below.

Turning to FIG. 2, reference numeral 200 outlines a method for determining a number of users being served by a target system or server, in accordance with an embodiment of the invention. The method starts at step 202 with deploying in step 204 a collection script or data collection script on each of a plurality of target systems. Further, in step 206, the collection script is run at a pre-determined point-in-time for collecting a set of user data or user statistics for each of the plurality of target systems. For instance, the data collection script may be run every hour or every few hours depending on what specific time is of interest, such that user data can be collected for that specific time. Further, in step 208, one or more electronic transmissions, such as, e-mails or File Transfer Protocol (File Transfer Protocol) files are generated for transmitting the set of user data or user statistics collected for each of the plurality of target systems. The one or more electronic transmissions or e-mails or FTP files are loaded into a data collection tool or component of monitoring system in step 210. Further, in step 212, the contents of the one or more electronic transmissions are parsed. In step 214, the parsed contents of the one or more electronic transmissions are stored in a storage, such as a database. Furthermore, in step 216, an output file is created which contains the set of user data or statistics. Moreover, in step 218, the output file is updated or refreshed at predetermined intervals, such that, user statistics or data is updated in real-time (as frequently as needed) in the monitoring system. The output file is transmitted in step 220 from the monitoring system, which monitors the user data for the plurality of target systems to one or more monitoring system clients, ending the process in step 222.

In another embodiment, the invention provides a system for predicting user load for a server at a pre-determined point-in-time. The system comprises a collection script configured to run, at a pre-determined point-in-time, on each of a plurality of servers, the collection script being configured to gather user statistics, including a number of concurrent users accessing each of the plurality of servers at the pre-determined point-in-time, a mail script configured to generate one or more electronic transmissions containing the user statistics gathered, and a utility script configured to load the one or more electronic transmissions generated into a data collection tool, the data collection tool being configured to create an output file containing the user statistics for predicting the user load for each of the plurality of servers at the pre-determined point-in-time. In an embodiment, the utility script is further configured to parse contents of the one or more electronic transmissions loaded, to store the contents parsed into a database and to update, at predetermined intervals, the user statistics stored. In an embodiment, the data collection tool is further configured to interface with one or more monitoring system clients. In an embodiment, the data collection tool is further configured to establish a user identity for each user for accessing any of the plurality of servers, the user identity being associated with one or more job roles and being associated with a business group of the one or more business groups, whereas the data collection tool is further configured to categorize each user as either an external user or an internal user, and wherein the data collection tool is further configured to set up a mail account for each of the plurality of servers, each of the plurality of servers being grouped into one or more regions. In an embodiment, the one or more electronic transmissions comprise at least one of: e-mails and FTP files and the output file created comprises an XML file that is configured to interface with the one or more monitoring system clients. In an embodiment, the user statistics gathered for each of the plurality of servers comprises at least one of: total number of users daily, total number of users hourly, average number of users daily, total number of users in each of the plurality of regions daily, total number of users in each of the plurality of regions hourly, average number of users daily in each of the plurality of regions, time of login by a user, business group to which a user belongs and time of logout by a user.

Figure 3:
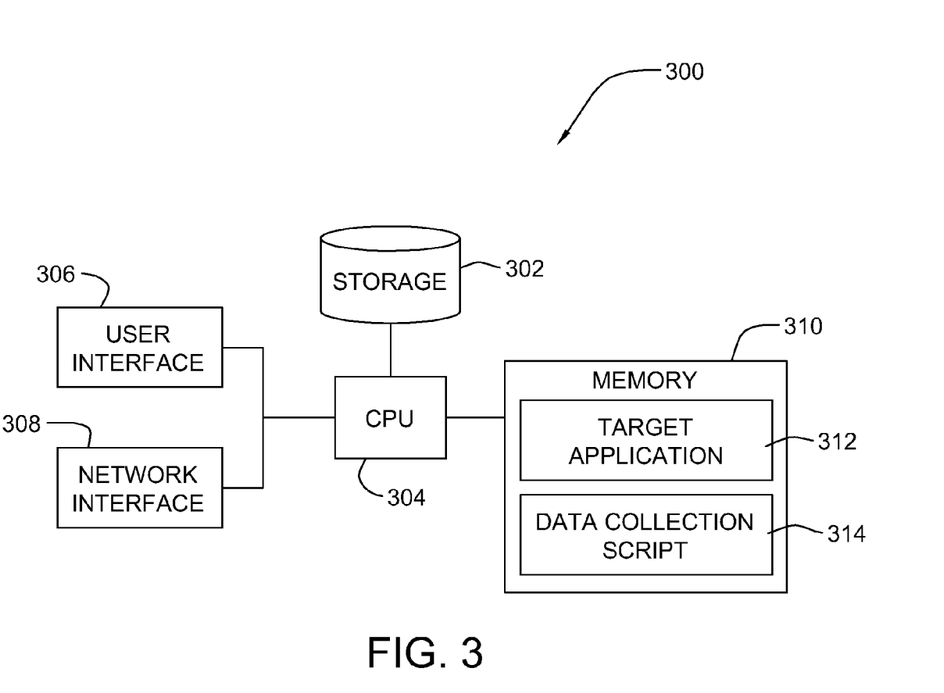
FIG. 3 is a schematic block diagram illustrating one embodiment of a target system having deployed thereon a data collection script, the data collection script being configured to gather user statistics, including the number of concurrent users in order to predict user load for the system, in accordance with an embodiment of the present invention.
Figure 4:
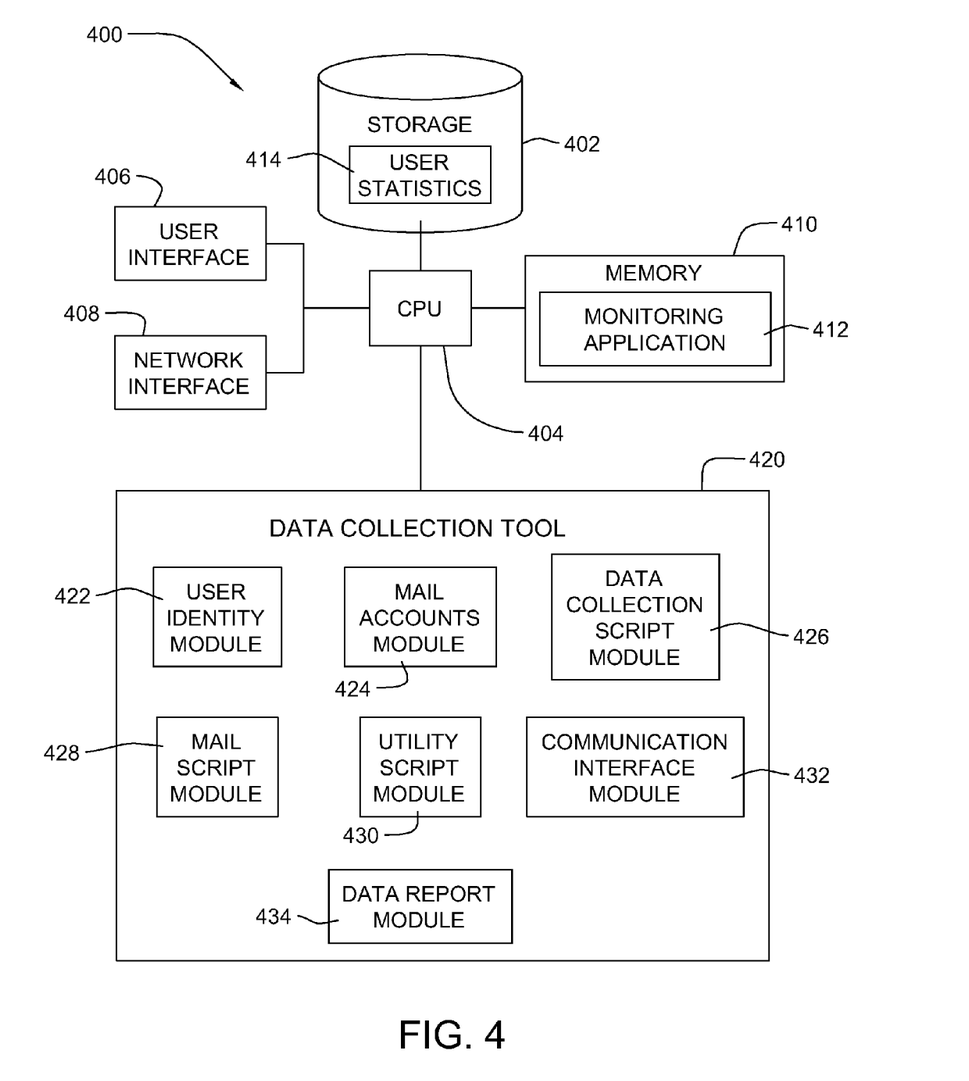
FIG. 4 is a schematic block system diagram illustrating one embodiment of a monitoring system having a data collection tool deployed thereon, the data collection tool being configured to collect user statistics from one or more target systems, in accordance with an embodiment of the present invention.

Reference is now made to FIGS. 3 and 4, which together illustrate a system used for determining or predicting user load for a server at a pre-determined point-in-time, in accordance with an embodiment of the invention. Turning to FIG. 3, numeral 300 provides a schematic block diagram illustrating one embodiment of a target system 300 having deployed thereon a data collection script 314 (also referred to herein as collection script), the data collection script 314 being configured to gather user statistics, such as the number of concurrent users being served by a target system in order to predict user load for a server, in accordance with an embodiment of the present invention. Preferably, the computing system 300 includes a central processing unit (CPU) 304, a local storage device 302, a user interface 306, a network interface 308, and a memory 310. The CPU 304 is configured generally to execute operations within the computing system 300. The user interface 306, in one embodiment, is configured to allow a user to interact with the computing system 300, including allowing input data and commands from a user and communicating output data to the user. In an embodiment, the user interface 306 may run on a user's computing system, such as, a desktop or a laptop and be configured to connect to a target system or server 300 having a target application deployed thereon. The network interface 308 is configured, in one embodiment, to facilitate network communications of the system/server 300 over a communications channel of a network (not shown in any of the drawings). The local memory 310 is configured, in one embodiment, to store a target application 312, for instance, a CRM (Customer Relationship Management) application, such as the Siebel® CRM application, which is commercially available from Siebel Systems, Inc. Further, in an embodiment, the memory 310 has deployed and running thereon a data collection script 314, which is configured to gather user statistics associated with the target system, including a number of concurrent users accessing the target server 300. The memory 310 is configured, in one embodiment, to store several data and metadata files that may be used in conjunction with gathering user statistics. In an alternative embodiment, some or all of these data and metadata files may be replicated in the local storage device 302. In a further embodiment, one or all of these data and metadata files may be stored exclusively in the local storage device 302 rather than in the memory 310. In another embodiment, one or all of these data and metadata files may be stored in distributed storage on the network system 300. Although the present description refers to "files," the present invention is understood to operate in substantially the same manner using other electronic memory and storage structures. Reference herein to a data file or metadata file is understood to equivalently refer to other such electronic memory and storage structures.

Turning to FIG. 4, FIG. 4 is a schematic block system diagram illustrating one embodiment of a monitoring system or server 400 having a data collection tool 420 deployed thereon, the data collection tool 420 being configured to collect the user statistics gathered for the system 400, in accordance with an embodiment of the present invention. Preferably, the monitoring system 400 is a server that includes a central processing unit (CPU) 404, a local storage device 402, a user interface 406, a network interface 408, and a memory 410. The CPU 404 is configured generally to execute operations within the system/server 400. The user interface 406, in one embodiment, is configured to allow a user to interact with the system 400, including allowing input data and commands from a user and communicating output data to the user. The network interface 408 is configured, in one embodiment, to facilitate network communications of the system 400 over a communications channel of a network (not shown in any of the drawings). The local memory 410 is configured, in one embodiment, to store a monitoring application or program 412 for monitoring a target system, such as the CRM Scorecard application that is commercially available from IBM Corporation, and which is configured to monitor a target system, such as the system 300 in FIG. 3. In one embodiment, as shown in FIG. 4, the monitoring application includes a data collection tool or component 420 which runs on the monitoring system 400 and comprises a logic unit that contains a plurality of modules configured to functionally execute the necessary steps of collecting user statistics or data, including a number of concurrent users served by a target system in order determine or predict user load for a system at a pre-determined time, such as a target system 300 in FIG. 3. In particular, the data collection tool 420 includes a user identity module 422, a mail accounts module 424, a data collection script module 426, a mail script module 428, a utility script module 430, a communication interface module 432 and a data report module 434. The user identity module 422 of the data collection tool 420 is configured to establish a user identity for each user in order for the user to be able to access a server, such as server 300 in FIG. 3. The mail accounts module 424 is configured to set up a mail account for each and every target system whose user load is being monitored. In an embodiment, each of the target systems is grouped into one or more geographical regions, such that a number of concurrent users or user load for a group of target systems in a particular geographical region can be determined. Further, the data collection script module 426 is configured to collect or receive the user statistics gathered by the data collection script 314 running on a target system 300 (as shown in FIG. 3). The mail script module 428 is configured to generate one or more electronic transmissions, such as e-mails or FTP files, etc., for transmitting the user statistics data obtained from the data collection script 314 running on a target system 300. Moreover, the utility script module 430 is configured to remotely load on to the system 400 user statistics or data obtained from the collection script 314 running on target system 300. Further, the utility script module 30 is configured to parse the user statistics loaded from the electronic transmissions for each geographical region and is configured to store the user statistics data 414 that has been parsed into a local storage 402. In particular, when the data collection tool 420 is executed, it causes the utility script module 430 to load electronic transmissions from all the mail accounts corresponding to the target systems in various geographical regions or locations. In particular, the utility script module 430 loads electronic transmissions, such as e-mails or FTP files (to name a few type of transmissions), which contain the user statistics data collected by a data collection script 314 running on a target system 300 (in FIG. 3). Further, the utility script module 430 is configured to parse the data loaded and to store the parsed data into a database in the monitoring system 400. In an embodiment, the utility script module 430 is configured also to update or refresh, at predetermined intervals, the user statistics data collected from various target systems and stored in the database in the monitoring system. The communication interface module 432 is configured to interface with one or more monitoring system clients that wish to obtain any user statistics collected for a particular target system, such that an output file, preferably, an XML file, can be transmitted to the one or more monitoring system clients over a network. Further, the data report module 434 is configured to generate a data report or graph displaying user statistics or data for a target system to a monitoring system client. For instance, the data report can display the number of users connected to each of the target systems on an hourly basis and/or the data report can display the users according to their respective business units or groups. As one can appreciate, the frequency for collecting the user statistics or data and for processing and loading the user statistics or data may vary depending on the specificity of user data being collected. Similarly, if there is an error in collecting user statistics or data, for instance, the user statistics reveal 0 users, then this may cause the system to increase the frequency by which user statistics or data is collected. Moreover, in an embodiment, a monitoring system client can set up or customize parameters, such as, frequency (how often data needs to be collected and/or refreshed), type of data, conditions and any other parameters associated with the user statistics or set of user data desired. In particular, if a monitoring system client wishes real-time data (that is, data that is updated to reflect current situation), then the monitoring system client may want to update data as frequently as every minute, for instance).

In yet another embodiment, the invention provides a computer program product for determining a number of concurrent users accessing a target system at a given point-in-time. The computer program product comprises a non-transitory computer readable medium, or a computer readable storage medium, which provides program code for use by or in connection with a computer or any instruction execution system. For the purposes of this description, the computer readable storage medium can be any apparatus that can store the program for use by or in connection with the instruction execution system, apparatus, or device. Preferably, the computer readable storage medium can be an electronic, magnetic, optical, electromagnetic, or semiconductor system (or apparatus or device). Examples of the computer-readable storage medium include a semiconductor or solid state memory, magnetic tape, a removable computer diskette, a read-only memory (ROM), a rigid magnetic disk and an optical disk.

Current examples of optical disks include compact disk-read only memory (CD-ROM), compact disk-read/write (CD-R/W) and DVD.

The computer program product further comprises first program instructions to collect, at established times, a set of user data from a plurality of target systems, the set of user data including a number of concurrent users accessing each of the plurality of target systems at the established times. The computer program product further includes second program instructions to generate one or more electronic transmissions containing the set of user data collected. The computer program product also includes third program instructions to load the one or more electronic transmissions generated into a data collection tool, the data collection tool being configured to create an output file containing the set of user data for determining the number of concurrent users accessing a target system of the plurality of target systems, and wherein the first, second and third program instructions are stored on the computer readable medium. In an embodiment, the first program instructions include instructions to deploy a collection script for collecting the set of user data on each of the plurality of target systems. Further, in an embodiment, the first program instructions include instructions to establish a user identity for each user seeking access to each of the plurality of target systems, the user identity for each user being associated with one or more job roles and being associated with a business group of the one or more business groups, and instructions to categorize each user as either an external user or an internal user. The first program instructions include instructions to set up a mail account for each of the plurality of target systems, where each of the plurality of target systems is grouped into one or more geographical regions. In an embodiment, the second program instructions include instructions to produce a count of the number of concurrent users for each of the one or more business units, to count separately any user having an unknown job role, and to provide a count of any external users. Further, in an embodiment, the third program instructions include instructions to parse contents of the one or more electronic transmissions loaded, to store the contents parsed into a database and to update, at predetermined intervals, the set of user data stored. In an embodiment, the set of user data collected for each of the plurality of target systems comprises at least one of total number of users daily, total number of users hourly, average number of users daily, total number of users in each of the plurality of regions daily, total number of users in each of the plurality of regions hourly, average number of users daily in each of the plurality of regions, time of login by a user, business group to which a user belongs and time of logout by a user, and wherein the one or more electronic transmissions comprise at least one of: e-mails and FTP files and the output file created comprises an XML file that is configured to interface with the one or more monitoring system clients. Preferably, each of the first, second, third and fourth program instructions are stored on the computer readable medium.

Figure 5:
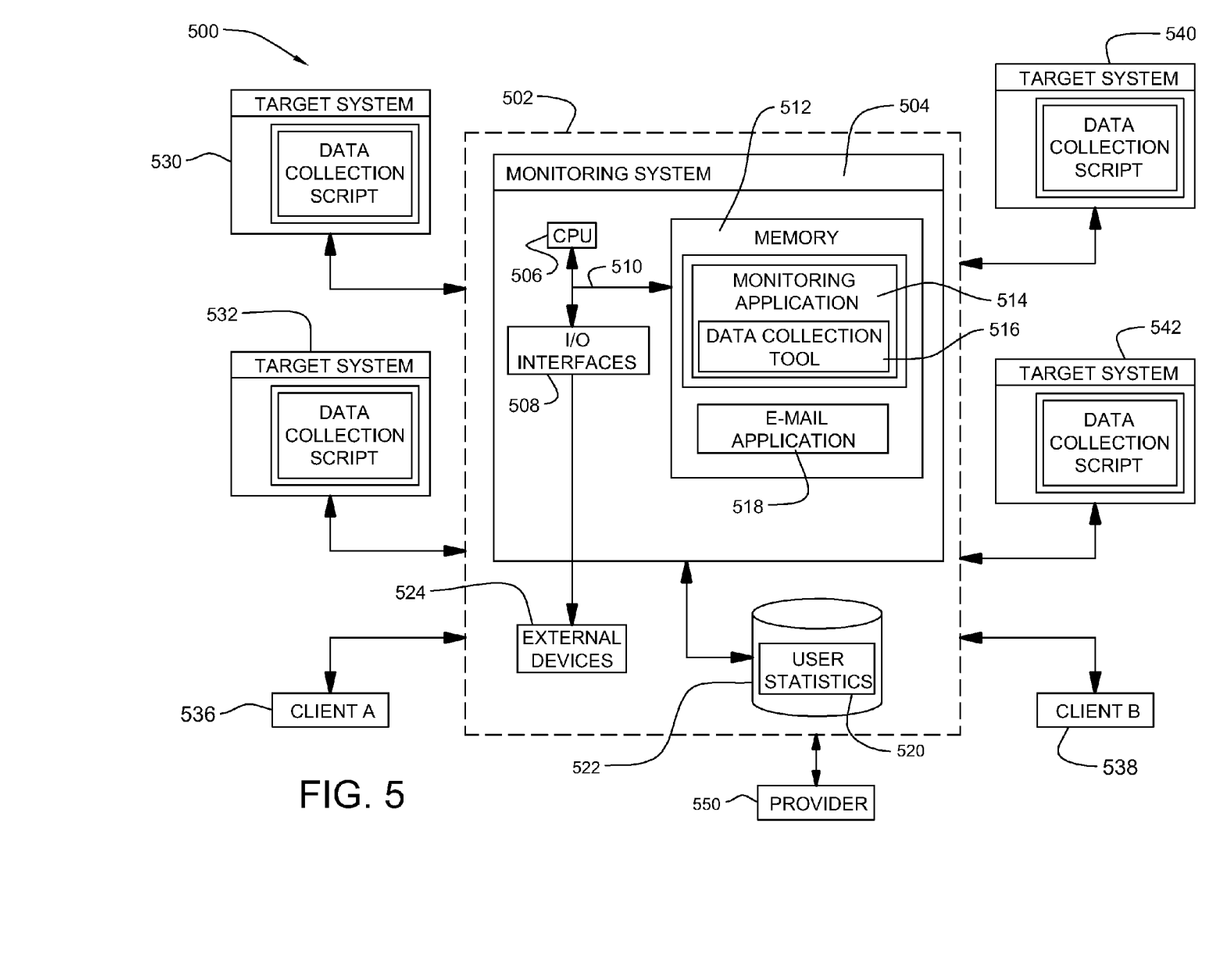
FIG. 5 is a schematic block system diagram illustrating a computer program product for collecting user statistics pertaining to a target system, including the number of concurrent users accessing a target system, in accordance with an embodiment of the invention.

Referring now to FIG. 5, there is illustrated a system 500 for collecting user statistics or set of user data in order to determine, for instance, a number of concurrent users accessing a target system, in accordance with an embodiment of the present invention. As depicted, system 500 includes a computer infrastructure 502, which is intended to represent any type of computer architecture that is maintained in a secure environment (i.e., for which access control is enforced). As shown, infrastructure 502 includes a monitoring system 504 that typically represents a server or the like configured to remotely monitor one or more target systems. It should be understood, however, that although not shown, other hardware and software components (e.g., additional computer systems, routers, firewalls, etc.) could be included in infrastructure 502.

In general, a target system 530 is connected via a network to infrastructure 502, which includes a system or server 504 that monitors user statistics or a set of user data associated with the target system 530, that has a target application running thereon (not shown in FIG. 5). Similarly, each of the target systems 532, 540 and 542 is configured to interface with infrastructure 502, such that the monitoring system 504 can monitor user statistics associated with each of the target systems 532, 540 and 542 having target applications (not shown in FIG. 5) running thereon. To this extent, infrastructure 502 provides a secure environment. In general, monitoring system clients, such as client A 536 and client B 538 access the monitoring system 504 directly, or over a network via interfaces (e.g., web browsers) loaded on computerized devices (e.g., personal computers, laptops, handheld devices, etc., not shown in FIG. 5). In the case of the latter, the network can be any type of network such as the Internet, a local area network (LAN), a wide area network (WAN), a virtual private network (VPN), etc. In any event, communication with infrastructure 502 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 502. It should be understood that under the present invention, infrastructure 502 could be owned and/or operated by a party such as provider 550, or by an independent entity. Regardless, use of infrastructure 502 and the teachings described herein could be offered to the parties on a subscription or fee-basis. In either scenario, an administrator (not shown in FIG. 5) could support and configure infrastructure 502.

Monitoring system 504 is shown to include a CPU (hereinafter "processing unit 506"), a memory 512, a bus 510, and input/output (I/O) interfaces 508. Further, computer system 500 is shown in communication with external I/O devices/resources 524 and storage system 522. In general, processing unit 506 executes computer program code, such as the monitoring application 514, which is stored in memory 510. Similarly, processing unit 506 executes the computer program code for the data collection tool 516 (part of the monitoring application 514), as well as e-mail application 518, which is configured to receive any electronic transmissions loaded in the monitoring system 504. While executing computer program code, the processing unit 506 can read and/or write data, to/from memory 512, storage system 522, and/or I/O interfaces 508. In particular, the database 522 stores user statistics or a set of user data 520 collected from one or more of the target systems 530, 532, 540 and 542. Bus 510 provides a communication link between each of the components in computer system 500. External devices 524 can comprise any devices (e.g., keyboard, pointing device, display, etc.) that enable a user to interact with computer system 500 and/or any devices (e.g., network card, modem, etc.) that enable computer system 500 to communicate with one or more other computing devices.

Computer infrastructure 502 is only illustrative of various types of computer infrastructures for implementing the invention. For example, in one embodiment, computer infrastructure 502 comprises two or more computing devices (e.g., a server cluster) that communicate over a network to perform the various process steps of the invention. Moreover, computer system 500 is only representative of various possible computer systems that can include numerous combinations of hardware. To this extent, in other embodiments, computer system 500 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 506 may comprise a single processing unit, or be distributed across one or more processing units in one or more locations, e.g., on a client and server. Similarly, memory 512 and/or storage system 522 can comprise any combination of various types of data storage and/or transmission media that reside at one or more physical locations. Further, I/O interfaces 508 can comprise any system for exchanging information with one or more external devices 524. Still further, it is understood that one or more additional components (e.g., system software, math co-processing unit, etc.) not shown in FIG. 5 can be included in computer system 500. However, if computer system 500 comprises a handheld device or the like, it is understood that one or more external devices 524 (e.g., a display) and/or storage system(s) 522 could be contained within computer system 500, not externally as shown.

Storage system 522 can be any type of system (e.g., a database) capable of providing storage for information under the present invention. To this extent, storage system 522 could include one or more storage devices, such as a magnetic disk drive or an optical disk drive. In another embodiment, storage system 522 includes data distributed across, for example, a local area network (LAN), wide area network (WAN) or a storage area network (SAN) (not shown). Although not shown, additional components, such as cache memory, communication systems, system software, etc., may be incorporated into computer system 500.

In another embodiment, the invention provides a process for deploying computing infrastructure that includes integrating computer-readable code into a computing system, wherein the code in combination with the computing system is capable of performing a process for monitoring user load for a target system at a pre-determined point-in-time. The process comprises establishing a user identity for each user seeking access to each of a plurality of target systems, the user identity for each user being associated with one or more job roles and being associated with a business group of the one or more business groups, categorizing each user as either an external user or an internal user, and setting up a mail account for each of the plurality of target systems, wherein each of the plurality of target systems is grouped into one or more geographical regions. The process further comprises running, at a pre-determined point-in-time, a collection script for collecting a set of user data from each of the plurality of target systems, the set of user data collected including a number of concurrent users logged into each of the plurality of target systems at the pre-determined point-in-time, generating one or more electronic transmissions for transmitting the set of user data collected from each of the plurality of target systems, and loading the one or more electronic transmissions generated into a monitoring system. In an embodiment, the running step further comprises deploying the collection script on each of the plurality of target systems. In an embodiment, the generating step further comprises producing a count of the number of concurrent users for each of the one or more business units, counting separately any user having an unknown job role, and providing a count of any external users. In an embodiment, the loading step further comprises parsing the set of user data loaded from the one or more electronic transmissions, storing the set of user data collected and parsed into a database, and updating, at predetermined intervals, the set of user data stored. Moreover, the process comprises creating an output file containing the set of user data, and transmitting the output file created from the monitoring system to one or more monitoring system clients. In an embodiment, the one or more electronic transmissions comprise at least one of: e-mails and FTP files and the output file created comprises an XML file that is configured to interface with the one or more monitoring system clients. Further, in an embodiment, the set of user data collected for each of the plurality of target systems comprises at least one of: total number of users daily, total number of users hourly, average number of users daily, total number of users in each of the plurality of regions daily, total number of users in each of the plurality of regions hourly, average number of users daily in each of the plurality of regions, time of login by a user, business group to which a user belongs and time of logout by a user.

Accordingly, any of the components of the present invention as shown in FIG. 5 can be deployed, managed, serviced by a service provider (such as provider 550 shown in FIG. 5) who offers to monitor and collect user statistics, including a concurrent user count or a user load for one or more target systems. Preferably, the invention provides a business method that performs the process steps of the invention on a subscription, advertising and/or fee basis. In particular, a service provider, such as a solution integrator could offer to provide user statistics, such as a concurrent user count or a user load for a target system. In this case, the service provider can, for instance, create, maintain, and support a computer infrastructure that performs the process steps of the invention for one or more customers. In return, the service provider can receive payment from the customer or customers under a subscription and/or fee agreement and/or the service provider can receive payment from the sale or advertising of content to one or more third parties.

Figure 6:
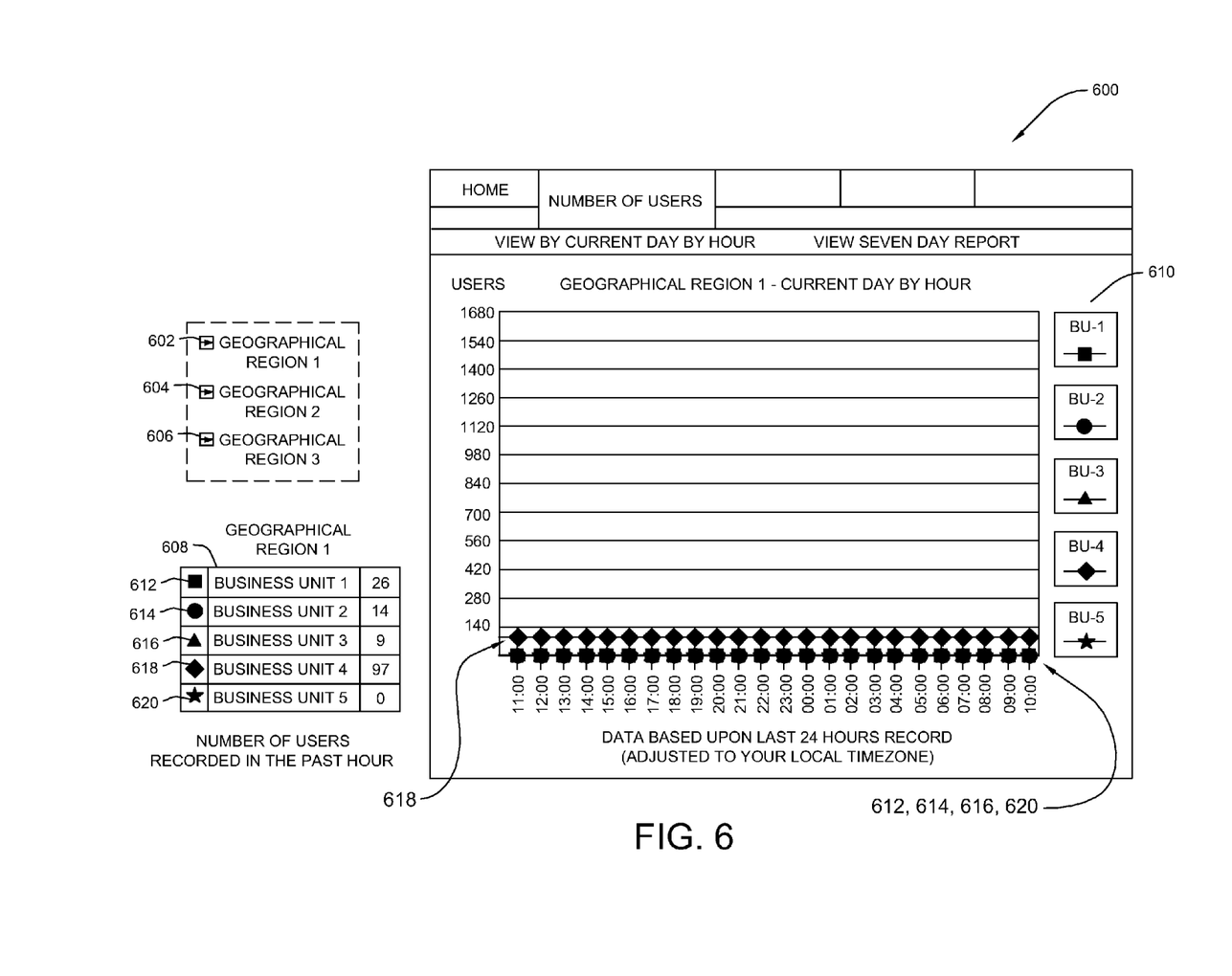
FIG. 6 illustrates a graphical view of real-time user data, such as a number of users logged into one or more target systems in a particular geographical region at given points-in-time, in accordance with an embodiment of the invention.

Reference in now made to FIG. 6, which illustrates a graphical view or report of user data associated with one or more target systems, in accordance with an embodiment of the invention. Turning to FIG. 6, reference numeral 600 is a graph that illustrates or presents a graphical view of user data, in particular, a number of users logged into one or more target systems in a particular geographical region at given points-in-time. In particular, as shown on the left hand side of FIG. 6, one can select the geographical region of interest by clicking or selecting the button 602 for geographical region 1 or by clicking or selecting the button 604 for geographical region 2 or by clicking or selecting the button 606 for geographical region 3. Table 608 provides a key for the various business units in geographical region 1 that are shown on the screen 610. In particular, a square 612 on the graph represents business unit 1, a circle 614 represents business unit 2, a triangle 616 represents business unit 3, a diamond 618 represents business unit 4 and a star 620 represents business unit 5. Table 608 also provides (in the right hand column) the number of users recorded in the past hour (since that was the choice selected in this example). On screen 610 (on the right hand side), the x-axis shows a breakdown of time by hour, whereas, the y-axis shows the number of users. As such, screen 610 provides a graphical display of the number of users in geographical region 1 at given points-in-time, namely, on an hourly basis. Although, FIG. 6 shows user data broken down by hour (that is, when the collection script is run every hour to collect user data), the graph could show other periodic intervals, for instance, an every other hour report or a seven day report, as long as the collection script is run as frequently as desired in order to obtain data for viewing a report for the time intervals desired. Similarly, although, FIG. 6, represents the number of users for a geographical region, alternatively, the graph could provide the number of users data collected for a single target system. Accordingly, the user data collected can be used to identify issues, such as, when a user load or stress on a system is the greatest or to implement strategies to prevent bottlenecks associated with a particular system or even in a particular region, thus, preventing outages, such as, when a system reaches its capacity. Moreover, the user data collected can be used to identify which business unit or business units are accessing target systems in a particular geographical region and the number of users for that particular business unit(s) that are accessing the target systems in a particular geographical region. Similarly, the user data can provide insights as to the impact to a business unit if an outage occurs at one particular hour versus another hour based on the number of users that are logged into a system at a given point-in-time.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for determining a number of users being served by a target system, said method comprising the steps of:

a processor of the target system running, at a pre-determined point-in-time, a data collection script for collecting a set of user data from the target system that is remotely coupled to a monitoring system, wherein the monitoring system runs a monitoring application comprising a data collection tool, wherein the data collection tool comprises: a user identity module, a mail accounts module, a data collection script, a mail script, a utility script, a communication interface module, and a data report module, wherein the target system runs components of the data collection tool that are previously deployed on the target system by the monitoring application, wherein the target system is a member to a geographical region, wherein said set of user data collected for the target system comprises: total number of users daily, total number of users hourly, average number of users daily, total number of users in he geographical region daily, total number of users in the geographical region hourly, average number of users daily in he geographical region, a first time of login by a user, a business group to which the user belongs, wherein the business group is a member to the geographical region, and a second time of logout by the user; and generating, by use of the mail script running on the target system, one or more electronic transmissions comprising said set of user data collected from said running; and the method further comprising:

retrieving, by the monitoring application, the generated one or more electronic transmissions from the target system by use of the utility script module that is configured to load the generated one or more electronic transmissions into the data collection tool running on the monitoring system, wherein the utility script module is configured to parse content of the transmitted electronic transmission and to update said set of user data stored in a database coupled to the monitoring system;

creating an output file comprising said set of user data from the target system by use of the data report module that is configured to generate a data report comprising user statistics for the target system; and transmitting said output file from said monitoring system to a monitoring system client by use of the communication interface module such that the monitoring system client is enabled to customize at least one parameter selected from the group consisting of said pre-determined point-in-time to run the data collection script, a type of data from the set of user data, and combinations thereof; and subsequent to said retrieving, parsing said set of user data loaded from said one or more electronic transmissions;

storing said set of user data collected and parsed into the database; and updating, at predetermined intervals, said set of user data stored based on said at least one parameter from said one or more monitoring system clients.

2. The method according to claim 1, the method further comprising:

prior to said running, determining at least one job role and a respective business group for each user seeking access to the target system;

establishing, by use of the user identity module of the data collection tool, a respective user identity for said each user, said respective user identity for said each user consisting of a respective username and a respective password associated with the respective username, categorizing said each user as either an external user or an internal user with respect to an organization comprising the target system and the monitoring system such that the monitoring system is enabled to separately track a first count of external users and a second count of internal users pursuant to said categorizing; and setting up, by use of the mail accounts module, a mail account for the target system such that the set of user data from the target system is collected via the mail account with the one or more generated electronic transmissions comprising the set of user data.

3. The method according to claim 1, the method further comprising:

prior to said running, deploying said data collection script on the target system, wherein said data collection script is configured to collect the set of user data and to communicate the collected set of user data to the monitoring system.

4. The method according to claim 2, the method further comprising:

producing a count of said number of concurrent users for the respective business group;

counting separately any user having an unknown job role, wherein the unknown job role is not a member of said one or more job roles that is associated with the user identity for all users; and providing a count of any external users with respect to the organization from said categorizing.

5. The method according to claim 1, wherein said one or more electronic transmissions comprise at least one of: e-mails and FTP files, and wherein said output file created comprises an XML file that is configured to interface with said one or more monitoring system clients such that each monitoring system client provides said at least one parameter to the monitoring system.

* * * * *